(12) United States Patent
Grimme

(10) Patent No.: US 11,814,276 B2
(45) Date of Patent: Nov. 14, 2023

(54) APPARATUS AND METHOD FOR CLOSING CONTAINERS WITH CLOSURES

(71) Applicant: Syntegon Technology GmbH, Waiblingen (DE)

(72) Inventor: Tobias Grimme, Feuchtwangen (DE)

(73) Assignee: Syntegon Technology GmbH, Waiblingen (DE)

( * ) Notice: Subject to any disclaimer, the term of this patent is extended or adjusted under 35 U.S.C. 154(b) by 0 days.

(21) Appl. No.: 17/960,234

(22) Filed: Oct. 5, 2022

(65) Prior Publication Data

US 2023/0131211 A1 Apr. 27, 2023

(30) Foreign Application Priority Data

Oct. 22, 2021 (DE) .................. 10 2021 127 564.4

(51) Int. Cl.
 *B67B 1/04* (2006.01)

(52) U.S. Cl.
 CPC ...................... *B67B 1/04* (2013.01)

(58) Field of Classification Search
 CPC ...... B65B 7/2821; B65B 57/04; B67C 7/0046; B67C 2007/0066; B67B 1/00; B67B 1/04; B67B 3/26; B67B 3/264; B67B 3/265; G01N 21/9054
 USPC .............. 53/53, 67, 72, 75, 76, 319
 See application file for complete search history.

(56) References Cited

U.S. PATENT DOCUMENTS

| | | | |
|---|---|---|---|
| 7,814,939 B2 | 10/2010 | Bernhard | |
| 2011/0302883 A1* | 12/2011 | Monti | B65B 7/2821 53/281 |
| 2013/0278927 A1* | 10/2013 | Johnson et al. | B67B 1/00 356/240.1 |

FOREIGN PATENT DOCUMENTS

| | | | |
|---|---|---|---|
| CN | 211366928 U | 8/2020 | |
| DE | 2605775 C3 | 4/1981 | |
| DE | 102015209367 A1 | 11/2016 | |
| DE | 102016200150 A1 | 7/2017 | |
| DE | 102016209710 A1* | 12/2017 | B07C 5/3404 |
| DE | 102018205728 A1* | 10/2019 | B67B 1/04 |
| EP | 3074332 B1* | 12/2017 | B65B 57/10 |
| GB | 307924 A * | 4/1930 | B67C 2007/0066 |

OTHER PUBLICATIONS

European Patent Office Action for Related Application No. 22196008.1 dated Mar. 24, 2023 (10 pages, including an English statement of relevance).
German Patent Office Notice of Examination for Application No. 102021127564.4 dated Jul. 5, 2022 (10 pages including English translation).

* cited by examiner

*Primary Examiner* — Stephen F. Gerrity
(74) *Attorney, Agent, or Firm* — Michael Best & Friedrich LLP

(57) ABSTRACT

An apparatus and a method for closing containers with closures is disclosed. The apparatus includes a transport wheel, a feed device, and a closing device. The transport wheel continuously transports the containers and includes a plurality of transport wheel receptacles. Each transport wheel receptacle is able to receive a container. The transport wheel is designed to be rotatable about a transport wheel axis. The feed device is capable of clocked feeding of the containers to the transport wheel in a feed region of the apparatus. The closing device is arranged to close containers while they are accommodated in the transport wheel receptacles of the transport wheel. A method for closing the containers includes feeding containers to the transport wheel and closing the containers with a closing device.

8 Claims, 1 Drawing Sheet

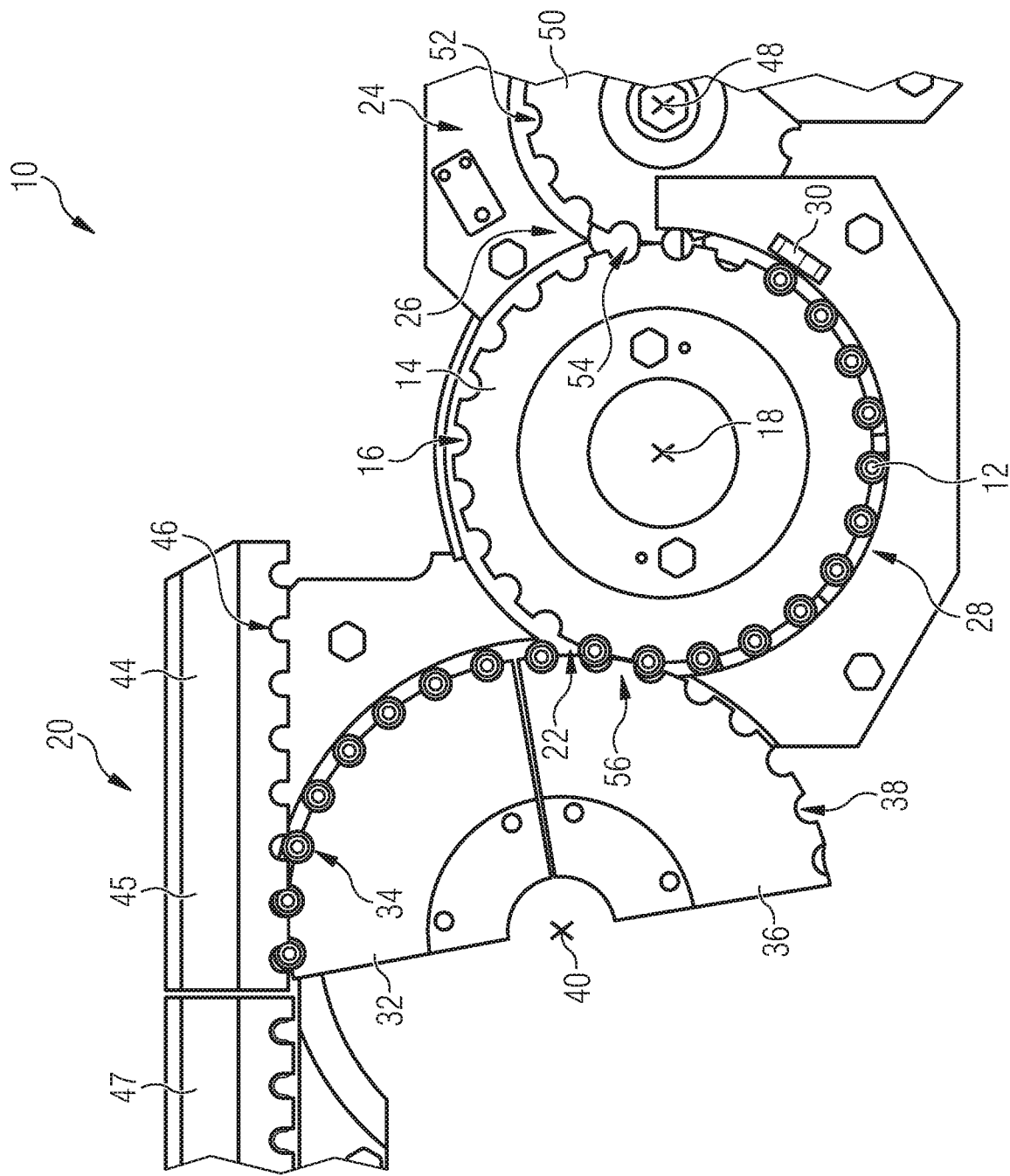

APPARATUS AND METHOD FOR CLOSING CONTAINERS WITH CLOSURES

BACKGROUND

The invention relates to an apparatus for closing containers with closures, in particular plugs, and to a method for closing containers with closures, in particular plugs.

Apparatuses for closing containers, such as vials, with closures, such as plugs, are known. For example, vials can be transported in a transport wheel and pressed upward via a ramp during transport. There, the plugs can be fed and positioned via a co-rotating stopper disk, so that the plugs are pressed into the vials when the vials are raised. Usually, a filling and closing system has only one plug insertion station for economic reasons. If an error occurs during the plugging or closing (blockage, min congestion, etc.), the corresponding vials are rejected as defective articles.

It is desirable to produce no or few defective articles.

DE 10 2016 200 150 A1 and CN 211 366 928 U each disclose an apparatus.

SUMMARY

The object of the present invention is to provide an apparatus for closing containers with closures, in particular plugs, and a method for closing containers with closures, in particular plugs, wherein defective articles are avoided or their number can be reduced at least in comparison to conventional methods.

This object is achieved by an apparatus for closing containers with closures, in particular plugs.

The apparatus comprises a transport wheel for continuously transporting the containers. The transport wheel has a plurality of transport wheel receptacles, wherein each transport wheel receptacle is configured to be able to receive a container. The transport wheel is designed to be rotatable about a transport wheel axis. The term "continuous transport" herein means that the containers are transported (conveyed), in particular at a constant speed, by the transport wheel without interruption (i.e., without a pause). In other words, during the transport of the containers, the transport wheel rotates continually about the transport wheel axis, in particular at a constant speed.

The apparatus further comprises a feed device for the clocked feeding of the containers to the transport wheel, said feeding being independent of the transport (or conveying) of the transport wheel. The feeding takes place in a feed region of the apparatus. In this case, the feeding can be interrupted or the feed device can be stopped while the transport wheel continues to convey or continues to rotate about the transport wheel axis. The term "clocked feeding" herein means that the containers are fed to the transport wheel in batches. In other words, the continuously rotating transport wheel is equipped with containers in batches.

The apparatus further comprises a discharge device for discharging the containers from the transport wheel in a discharge region of the apparatus. Discharging the containers may be implemented continuously in this case. It is likewise conceivable for the discharging of the containers to be implemented in a clocked manner.

The apparatus further comprises a closing device for closing the containers with closures. The closing device is designed and arranged to close the containers while they are accommodated in the transport wheel receptacles of the transport wheel. Since the containers are closed during the continuous transport, this can be referred to as a continuous closing.

The closing device can be designed in the form of a closing wheel and can be arranged above the transport wheel (i.e., in the direction of gravity, the closing wheel is arranged first and then the transport wheel). The closing wheel can rotate continuously about the transport wheel axis at the same speed as the transport wheel. The closing wheel can have closing wheel receptacles that can be designed to receive a respective closure. The closures can be brought (positioned) above the containers transported in the transport wheel. The containers can, for example, be transported via a ramp and thereby can be conveyed upward (i.e., counter to the direction of gravity) in the direction of the closures (this "raising" is however so small that the containers remain in the receptacles of the transport wheel), so that the closures and the containers are pressed together and the containers are thus closed.

Other closing devices are also conceivable, such as in the form of a closing wheel, wherein the axis of rotation of the closing wheel and of the transport wheel can be arranged at a distance from one another. It is likewise conceivable for the closing device to comprise a robot arm or can be designed as a robot arm.

The apparatus further comprises an inspection device. The inspection device is configured and arranged to check a closed state of a respective container in a transport wheel receptacle of the transport wheel at a position of the transport wheel.

The inspection device can identify incorrectly closed containers. In other words, by means of the inspection device it can be checked whether or not a container has been correctly closed. An incorrectly closed container can, for example, be a container without a closure. It is likewise conceivable for the closure to be attached incompletely or obliquely to the container, which can likewise constitute an incorrectly closed container.

The inspection device can comprise a detection device. The detection device can be configured to detect a container, in particular with its closure, in the form of optical data. The detection device can comprise an optical sensor, a light barrier and/or a camera. The optical data can, for example, be a video, an image/photo or a (or a plurality of) measured brightness value (intensity). For example, by means of a light barrier it can be checked whether or not a closure is present on a container. For this purpose, the light barrier can be arranged, for example, just above the container, wherein a container with a closure interrupts the light barrier and a container without a closure does not interrupt the light barrier.

The inspection device can further comprise an evaluation device (e.g., in the form of a computer). In this case, the evaluation device can be configured to evaluate the optical data detected by means of the detection device. For example, it can be determined on the basis of an image of a container recorded by means of a camera whether or not a closure is present on a container. With respect to the light barrier mentioned above, it is conceivable for the evaluation device to be able to determine whether or not the light barrier has been interrupted and, accordingly, whether or not a closure is present on the container.

The feed region, the closing device, the inspection device and the discharge region are arranged successively in the direction of rotation of the transport wheel.

The apparatus is configured to feed the containers identified as incorrectly closed by means of the inspection device, again to the closing device by means of the transport wheel, and in particular a switch.

The apparatus is configured to hold the incorrectly closed containers in the discharge region in their transport wheel receptacles in the transport wheel, so that the incorrectly closed containers are transported again into the feed region by rotation of the transport wheel. In other words, the incorrectly closed containers are not discharged from the transport wheel by means of the discharge device, but are left in the transport wheel. The transport wheel transports the incorrectly closed containers again to the closing device by rotation about the transport wheel axis.

The feed device is designed to interrupt the feeding of further containers if an incorrectly closed container has been identified. The incorrectly closed containers can thus pass through the feed region and can be fed again to the closing device. It is conceivable for the closing device to close the incorrectly closed container with a new closure It is likewise conceivable for the closing device to reposition an incorrectly seated (incompletely closed or obliquely attached) closure.

The initially incorrectly closed containers can thus be correctly closed during the further passage. In other words, the incorrectly closed containers do not have to be sorted out and disposed of as defective articles, but can be further processed by re-closing and can become the finished product. This is not only more resource-saving but also more economical (in particular in the case of expensive products). The already filled containers that have not been correctly closed must no longer be sorted out or disposed of together with the contents, but can be used further.

The feed device can comprise a first wheel segment for feeding the containers to the transport wheel receptacles of the transport wheel. The first wheel segment can have at least one first wheel segment receptacle. The first wheel segment receptacle can be configured to be able to receive a container.

The feed device can comprise a second wheel segment for feeding the containers to the transport wheel receptacles of the transport wheel. The second wheel segment can have at least one second wheel segment receptacle. The second wheel segment receptacle can be configured to be able to receive a container.

The first wheel segment, the second wheel segment and/or the transport wheel can be configured to transfer the containers from the first wheel segment receptacle and/or the second wheel segment receptacle to the transport wheel receptacles of the transport wheel in the feed region of the apparatus. The first wheel segment and the second wheel segment can be designed to be rotatable about a common wheel segment axis. The first wheel segment and the second wheel segment can be designed to be movable (rotatable) independently of one another. In particular, the two wheel segments and their movements can be decoupled from one another.

It is likewise conceivable for the (rotating) movement of the two wheel segments to be coupled. In other words, it is conceivable that the first wheel segment and the second wheel segment can only be rotated together. It is in particular conceivable for the two wheel segments to be arranged at a distance from one another along their movement path about the wheel segment axis.

The feed device can comprise at least one (in particular two) transport rake for feeding the containers to the first wheel segment and/or the second wheel segment. In other words, the transport rake can be configured for loading the first and/or the second wheel segment. It is likewise conceivable for the feed device to have exactly one transport rake.

The transport rake can have at least one transport rake receptacle configured to be able to receive a container. The transport rake can be designed to be linearly movable. The transport rake can be configured to be moved translationally (i.e., without a change in its orientation). It is likewise conceivable that two transport rakes can be provided, wherein a first transport rake can be provided for loading the first wheel segment and a second transport rake can be provided for loading the second wheel segment.

The discharge device can comprise a removal wheel for discharging correctly closed containers from the transport wheel receptacles of the transport wheel. The removal wheel can be designed to be rotatable about a removal wheel axis. The removal wheel can have at least one removal wheel receptacle configured to be able to receive a container. In particular, the transport wheel and the removal wheel can be configured and arranged in such a way that the transport wheel receptacles and the removal wheel receptacles pass through the discharge region of the apparatus in a manner corresponding to one another.

The transport wheel axis, the wheel segment axis and/or the removal wheel axis can be arranged in parallel to one another. The transport wheel, the first wheel segment, the second wheel segment and/or the removal wheel can be arranged in the same plane, which is in particular horizontal with respect to the direction of gravity.

The apparatus can comprise a switch in the discharge region. The switch can be configured to selectively transfer a container received in the transport wheel receptacle of the transport wheel into the removal wheel receptacle of the removal wheel or leave it in the transport wheel receptacle of the transport wheel. In other words, the transport path (movement path) of a container, in particular within the discharge region, can be determined or selected between two possible transport paths by means of the switch.

The apparatus can comprise a guide device in the feed region. The guide device can be designed in the form of a switch. The guide device can be configured to guide at least one container that has been received in the transport wheel receptacle of the transport wheel and has in particular been identified as an incorrectly closed container, at least in the feed region, in particular in a further revolution of the transport wheel. In other words, the containers can be held on their movement path ("on track") in the feed region by means of the guide device. The guide device can be configured to prevent containers from falling out of the transport wheel receptacles, in particular in the feed region of the apparatus. The guide device can be designed in the form of a curved element that holds the containers in the transport wheel receptacles of the transport wheel.

The object to be achieved is further achieved by a method for closing containers with closures, in particular plugs, with the features of the other independent claim The method comprises the steps of:
  feeding containers to a transport wheel in a clocked and interruptible manner; in this case, the feeding can be implemented in particular by means of a feed device.
  continuously transporting the containers by means of the transport wheel;
  closing the containers by means of a closing device with a respective closure while the containers are accommodated in the transport wheel;
  inspecting the closed containers while the containers are accommodated in the transport wheel; in this case, inspecting can be implemented in particular by means of an inspection device.

identifying an incorrectly closed container and interrupting the feeding of further containers;
transporting the incorrectly closed container by means of the transport wheel, and in particular two switches, to re-closing;
re-closing the incorrectly closed container. In this case, re-closing can be implemented in particular by means of the closing device.

The method may comprise the steps of:
feeding containers by means of a first wheel segment through a rotating movement of the first wheel segment to the transport wheel in a feed region;
feeding containers by means of a second wheel segment through a rotating movement of the second wheel segment to the transport wheel in the feed region;
moving the first wheel segment and/or the second wheel segment in such a way that the first wheel segment and the second wheel segment are arranged outside the feed region after an incorrectly closed container has been identified;
transporting the incorrectly closed container from the inspection device through the discharge region and the feed region by means of the transport wheel again to the closing device.

The containers that are in particular identified as incorrectly closed can be moved through the feed region in a guided manner. This can be implemented by means of a guide device.

After the inspection, the containers can selectively be discharged from the transport wheel, in particular by means of a discharge device, or can be transported by means of the transport wheel, and in particular second switches, to re-closing.

The containers can be fed in a clocked manner to the first wheel segment and/or to the second wheel segment, in particular by means of at least one transport rake, in particular by means of exactly one transport rake. In this case, it is conceivable for the first or the second wheel segment to be loaded with containers in one clock cycle. It is likewise conceivable for a transport rake equipped with containers to transfer its containers to the first or the second wheel segment in one clock cycle. In particular, exactly one transport rake can be provided.

It is likewise conceivable that two transport rakes can be provided, wherein a first transport rake can be provided for loading the first wheel segment and a second transport rake can be provided for loading the second wheel segment.

In the method, it can be provided that while the containers are fed to the first wheel segment, the containers received in the second wheel segment are fed to the transport wheel. Additionally or alternatively, it can be provided that while the containers are fed to the second wheel segment, the containers received in the first wheel segment are fed to the transport wheel. In other words, it is conceivable for the first wheel segment and the second wheel segment to be loaded with containers successively and independently of one another. It is likewise conceivable for the first wheel segment and the second wheel segment to transfer their containers to the transport wheel successively and independently of one another.

In order to carry out the method, an apparatus according to the above statements can be used. With regard to the advantages that can be achieved with the method, reference is made to the statements relating to the apparatus in this respect. The measures described in connection with the apparatus can serve for developing the method.

BRIEF DESCRIPTION OF THE DRAWINGS

Further features, details and advantages of the invention emerge from the wording of the claims and from the following description of an exemplary embodiment with reference to the drawing. The drawing shows:

The only drawing illustrates a schematic of the apparatus according to the invention.

In the following description and in the FIGURE, corresponding components and elements bear the same reference signs.

DETAILED DESCRIPTION

The drawing shows a schematic illustration of the apparatus 10 according to the invention for closing containers 12.

The apparatus 10 has a transport wheel 14 for the continuous transport of the containers 12. The transport wheel 14 has a plurality (here twenty-four) of transport wheel receptacles 16.

Each of the transport wheel receptacles 16 is configured to be able to receive a container 12. Here, the transport wheel receptacles 16 are designed as radially outward directed recesses on the outer circumference of the transport wheel 14.

The transport wheel 14 is designed to be rotatable about a transport wheel axis 18. The containers 12 are thus transported or conveyed continuously in the transport wheel receptacles 16 on a circular path about the transport wheel axis 18. In other words, the transport wheel 14 rotates continuously about the transport wheel axis 18.

The apparatus 10 has a feed device 20. The latter is designed for the clocked feeding of the containers 12 to the transport wheel 14, said feeding being independent of the transport of the transport wheel 14. The containers 12 are fed to the transport wheel 14 in a feed region 22 of the apparatus 10.

The apparatus 10 has a discharge device 24. The latter is designed to discharge the containers 12 from the transport wheel 14. The containers 12 are discharged from the transport wheel 14 in a discharge region 26 of the apparatus 10.

The apparatus 10 has a closing device 28. The latter serves to close the containers 12 with closures. The closing device 28 is designed and arranged to close the containers 12 while they are accommodated in the transport wheel receptacles 16 of the transport wheel 14 and are moved on their circular path about the transport wheel axis 18. For the sake of clarity, the closing device 28 is not shown in the drawing, but is only indicated with reference numeral 28 and the associated arrow.

The apparatus 10 has an inspection device 30. The inspection device 30 is configured to check a closed state of a respective container 12 in the transport wheel receptacle 16 of the transport wheel 14 The inspection device 30 is only schematically indicated in the drawing.

The feed device 20 has a first wheel segment 32. The latter serves to feed the containers 12 to the transport wheel receptacles 16 of the transport wheel 14 and here has eight first wheel segment wheel receptacles 34. Each of the first wheel segment wheel receptacles 34 is configured to be able to receive a container 12. The first wheel segment 32 can thus be equipped with eight containers 12.

The feed device 20 has a second wheel segment 36. The latter serves to feed the containers 12 to the transport wheel receptacles 16 of the transport wheel 14 and here has eight second wheel segment wheel receptacles 38. Each of the second wheel segment wheel receptacles 38 is configured to be able to receive a container 12. The second wheel segment 36 can thus be equipped with eight containers 12.

The first wheel segment 32 and the second wheel segment 36 are designed to be rotatable about a common wheel segment axis 40. Here, the two wheel segments 32, 36 can be rotated independently of one another about the common wheel segment axis 40.

The feed device 20 here has two transport rakes 44. The latter serve to feed the containers 12 to the two wheel segments 32, 36. Each transport rake 44 here has eight (corresponding to the number of first or second wheel segment receptacles 34, 38) transport rake receptacles 46. Each of the transport rake receptacles 46 is configured to be able to receive a container 12.

The first wheel segment 32 here is equipped with containers 12 by means of a first transport rake 45. The second wheel segment 36 is equipped by means of a second transport rake 47. In this case, both the feeding of the containers 12 to the two wheel segments 32, 36 and the feeding of the containers 12 to the transport wheel 14 takes place in batches (i.e., in a clocked manner).

The two wheel segments 32, 36 can also be loaded with a single transport rake. After the loading of the first wheel segment 32, said single transport rake can reset in a square movement, receive new containers 12, and again be moved in the direction of the two wheel segments 32, 36, in order to load the second wheel segment 36, etc.

The discharge device 24 has a removal wheel 50. The latter serves to discharge correctly closed containers 12 from the transport wheel receptacles 16 of the transport wheel 14. The removal wheel 50 is designed to be rotatable about a removal wheel axis 48. The removal wheel 50 has a plurality of removal wheel receptacles 52. Each of the removal wheel receptacles 52 is configured to be able to receive a container 12.

The wheel segment axis 40, the transport wheel axis 18 and the removal wheel axis 48 are each indicated in the drawing by means of a cross and each run perpendicularly to the drawing plane of the drawing.

In the discharge region 26, the apparatus 10 has a switch 54. The switch 54 is configured to selectively transfer a container 12 received in the transport wheel receptacle 16 of the transport wheel 14 to the removal wheel 50 or leave it in the transport wheel receptacle 16. For the sake of clarity, the switch 54 is not shown in the drawing, but is only indicated with reference numeral 54 and the associated arrow.

In the feed region 22, the apparatus 10 has a guide device 56. The latter can be designed in the form of a switch. A guided movement of the containers on their circular path about the transport wheel axis 18 in the feed region 22 is possible by means of the guide device 56. For the sake of clarity, the guide device 56 is not shown in the drawing, but is only indicated with reference numeral 56 and the associated arrow.

The apparatus 10 functions as follows:

The first wheel segment 32 and the second wheel segment 36 are equipped with containers 12 successively and alternately (i.e., in a clocked manner) by means of the two transport rakes 44.

While a wheel segment (the first wheel segment 32 in the drawing) is equipped with containers 12 by means of the transport rake 44 (by means of the first transport rake 45 in the drawing), the other wheel segment already equipped with containers 12 (the second wheel segment 36 in the drawing) feeds the received containers 12 to the transport wheel 14. This constitutes a clock cycle.

Subsequently, in a next clock cycle, the now empty wheel segment (the second wheel segment 36 in the drawing) is equipped with containers 12 by means of the transport rake 44 (by means of the second transport rake 47 in the drawing), while the wheel segment equipped with containers 12 (the first wheel segment 32 in the drawing) feeds the received containers 12 to the transport wheel 14.

Whenever a clock cycle has ended, one wheel segment is equipped with containers 12, whereas the other wheel segment does not have any containers 12.

After the above-described clocked feeding of the containers 12 to the transport wheel 14, said containers are transported continuously. During continuous transport, the containers 12 are closed by means of the closing device 28. This can therefore be referred to as a continuous closing of the containers 12.

If an incorrectly closed container 12 (for example, a container without a closure) is now found by means of the inspection device 30, the feeding of the containers 12 is interrupted. For this purpose, the two wheel segments 32, 36 end the respective clock cycle. In the drawing, for this purpose the first wheel segment 32 would be fully equipped, whereas the second wheel segment 36 would be completely emptied.

Subsequently, the first wheel segment 32, which is now equipped with the containers 12, would be stopped, whereas the now empty second wheel segment 36 would continue to be rotated until the feed region 22 is vacated. Subsequently, the second wheel segment 36 can also be stopped outside the feed region 22.

In the meanwhile, the container that has been recognized as incorrectly closed is transported further on its circular path by means of the transport wheel 14. The switch 54 is switched in such a way that the incorrectly closed container 12 is not transferred to the removal wheel 50, but is further conveyed on a circular path about the transport wheel axis 18 by means of the transport wheel 14

After the incorrectly closed container 12 has passed through the switch 54, the switch 54 can be switched again, so that subsequent correctly closed containers 12 can continue to be discharged by means of the removal wheel 50.

The incorrectly closed container 12 is thus guided back into the feed region 22 on a circular path and further again to the closing device 28. There, the incorrectly closed container 12 can be closed with a new closure or can be closed correctly.

The incorrectly closed container 12 is moved in a guided manner through the feed region 22. This takes place by means of the guide device 56, which can be designed, for example, in the form of a switch or a curved element, which holds the lower end of the incorrectly closed container 12 on the circular path about the transport wheel axis 18 (and thus also in the transport wheel receptacle 16).

After the incorrectly closed container 12 has passed through the feed region 22, the clocked feeding can be continued by means of the feed device 20.

What is claimed is:

1. An apparatus (10) for closing containers (12) with closures, the apparatus comprising:
a transport wheel (14) for continuously transporting the containers (12), wherein the transport wheel (14) has a plurality of transport wheel receptacles (16), wherein each transport wheel receptacle (16) is configured to be able to receive a container (12), wherein the transport wheel (14) is designed to be rotatable about a transport wheel axis (18), a feed device (20) for the clocked feeding of the containers (12) to the transport wheel (14) in a feed region (22) of the apparatus (10), said feeding being independent of the transport of the transport wheel (14), a discharge device (24) for discharging the containers (12) from the transport wheel (14) in a discharge region (26) of the apparatus (10), a closing device (28) for closing the containers (12) with closures, said closing device being designed and arranged to close containers (12) while they are accommodated in the transport wheel receptacles (16) of the transport wheel (14), an inspection device (30), wherein the inspection device (30) is configured and arranged to check a closed state of a respective container (12) in a transport wheel receptacle (16) of the transport wheel (14) at a position of the transport wheel (14), wherein the feed region (22), the closing device (28), the inspection device (30) and the discharge region (26) are arranged successively in the direction of rotation of the transport wheel (14), wherein the apparatus (10) is configured to feed the containers (12) identified as incorrectly closed by the inspection device (30), again to the closing device (28) by the transport wheel (14), wherein the apparatus (10) is configured to hold the incorrectly closed containers (12) in the discharge region (26) in their transport wheel receptacles (16) in the transport wheel (14), so that the incorrectly closed containers (12) are transported again into the feed region (22) by rotation of the transport wheel (14), wherein the feed device (20) is designed to interrupt the feeding of further containers (12) in this case, so that the incorrectly closed containers (12) pass through the feed region (22) and can be fed to the closing device (28) again, and wherein the feed device comprises:

a first wheel segment (32) for feeding the containers (12) to the transport wheel receptacles (16) of the transport wheel (14), said first wheel segment having at least one first wheel segment receptacle (34) configured to be able to receive a container (12), a second wheel segment (36) for feeding the containers (12) to the transport wheel receptacles (16) of the transport wheel (14), said second wheel segment having at least one second wheel segment receptacle (38) configured to be able to receive a container (12), wherein the first wheel segment (32), the second wheel segment (36) and/or the transport wheel (14) are configured to transfer the containers (12) from the first wheel segment receptacle (34) and/or the second wheel segment receptacle (38) to the transport wheel receptacles (16) of the transport wheel (14) in the feed region (22) of the apparatus (10).

2. The apparatus (10) according to claim 1 characterized in that the feed device (20) comprises at least one transport rake (44) for feeding the containers (12) to the first wheel segment (32) and/or the second wheel segment (36), wherein the transport rake (44) has at least one transport rake receptacle (46) configured to be able to receive a container (12).

3. The apparatus (10) according to claim 1, characterized in that the discharge device (24) comprises a removal wheel (50), which is rotatable about a removal wheel axis (48), for removing correctly closed containers (12) from the transport wheel receptacles (16) of the transport wheel (14), wherein the removal wheel (50) has at least one removal wheel receptacle (52) configured to be able to receive a container (12).

4. The apparatus (10) according to claim 3, characterized in that the apparatus (10) comprises a switch (54) in the discharge region (26), wherein the switch (54) is configured to selectively transfer a container (12) received in the transport wheel receptacle (16) of the transport wheel (14) into the removal wheel receptacle (52) of the removal wheel (50) or leave it in the transport wheel receptacle (16) of the transport wheel (14).

5. The apparatus (10) according to claim 1, characterized in that the apparatus (10) comprises, in the feed region (22), a guide device (56), wherein the guide device (56) is configured to guide at least one container (12), which has been received in the transport wheel receptacle (16) of the transport wheel (14) at least in the feed region (22).

6. A method for closing containers (12) with closures, the method comprising the steps of:

feeding containers (12) to a transport wheel (14) in a clocked and interruptible manner;

continuously transporting the containers (12) by the transport wheel (14);

closing the containers (12) by a closing device (28) with a respective closure while the containers (12) are accommodated in the transport wheel (14);

inspecting the closed containers (12);

identifying an incorrectly closed container (12) and interrupting the feeding of further containers;

transporting the incorrectly closed container (12) by the transport wheel (14) to re-closing;

re-closing the incorrectly closed container (12), and wherein the method further comprises the steps of:

feeding containers (12) by a first wheel segment (32) through a rotating movement of the first wheel segment (32) to the transport wheel (14) in a feed region (22);

feeding containers (12) by a second wheel segment (36) through a rotating movement of the second wheel segment (36) to the transport wheel (14) in the feed region (22);

moving the first wheel segment (32) and/or the second wheel segment (36) in such a way that the first wheel segment (32) and the second wheel segment (36) are arranged outside the feed region (22) after an incorrectly closed container (12) has been identified;

transporting the incorrectly closed container (12) from an inspection device (30) through a discharge region (26) and the feed region (22) by the transport wheel (14) again to the closing device (28).

7. The method according to claim 6, characterized in that while the containers (12) are fed to the first wheel segment (32), the containers (12) received in the second wheel segment (36) are fed to the transport wheel (14) and/or in that while the containers (12) are fed to the second wheel segment (36), the containers (12) received in the first wheel segment (32) are fed to the transport wheel (14).

8. An apparatus (10) for closing containers (12) with closures, the apparatus comprising:

a transport wheel (14) for continuously transporting the containers (12), wherein the transport wheel (14) has a plurality of transport wheel receptacles (16), wherein each transport wheel receptacle (16) is configured to be able to receive a container (12), wherein the transport wheel (14) is designed to be rotatable about a transport wheel axis (18), a feed device (20) for the clocked feeding of the containers (12) to the transport wheel (14) in a feed region (22) of the apparatus (10), said feeding being independent of the transport of the transport wheel (14), a discharge device (24) for discharging the containers (12) from the transport wheel (14) in a discharge region (26) of the apparatus (10), a closing device (28) for closing the containers (12) with closures, said closing device being designed and arranged to close containers (12) while they are accommodated in the transport wheel receptacles (16) of the transport wheel (14), an inspection device (30), wherein the inspection device (30) is configured and arranged to check a closed state of a respective container (12) in a transport wheel receptacle (16) of the transport wheel (14) at a position of the transport wheel (14), wherein the feed region (22), the closing device (28), the inspection device (30) and the discharge region (26) are arranged successively in the direction of rotation of the transport wheel (14), wherein the apparatus (10) is configured to feed the containers (12) identified as incorrectly closed by the inspection device (30), again to the closing device (28) by the transport wheel (14), wherein the apparatus (10) is configured to hold the incorrectly closed containers (12) in the discharge region (26) in their transport wheel receptacles (16) in the transport wheel (14), so that the incorrectly closed containers (12) are transported again into the feed region (22) by rotation of the transport wheel (14), wherein the feed device (20) is designed to interrupt the feeding of further containers (12) in this case, so that the incorrectly closed containers (12) pass through the feed region (22) and can be fed to the closing device (28) again, and wherein the apparatus (10) comprises, in the feed region (22), a guide device (56), wherein the guide device (56) is configured to guide at least one container (12), which has been received in the transport wheel receptacle (16) of the transport wheel (14) at least in the feed region (22).

* * * * *